No. 666,065. Patented Jan. 15, 1901.
E. R. OLIVER.
NUT LOCK.
(Application filed Mar. 17, 1900.)
(No Model.)
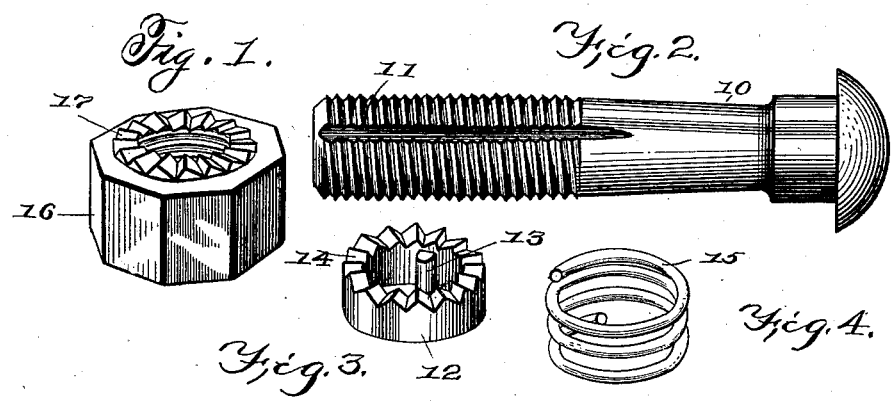
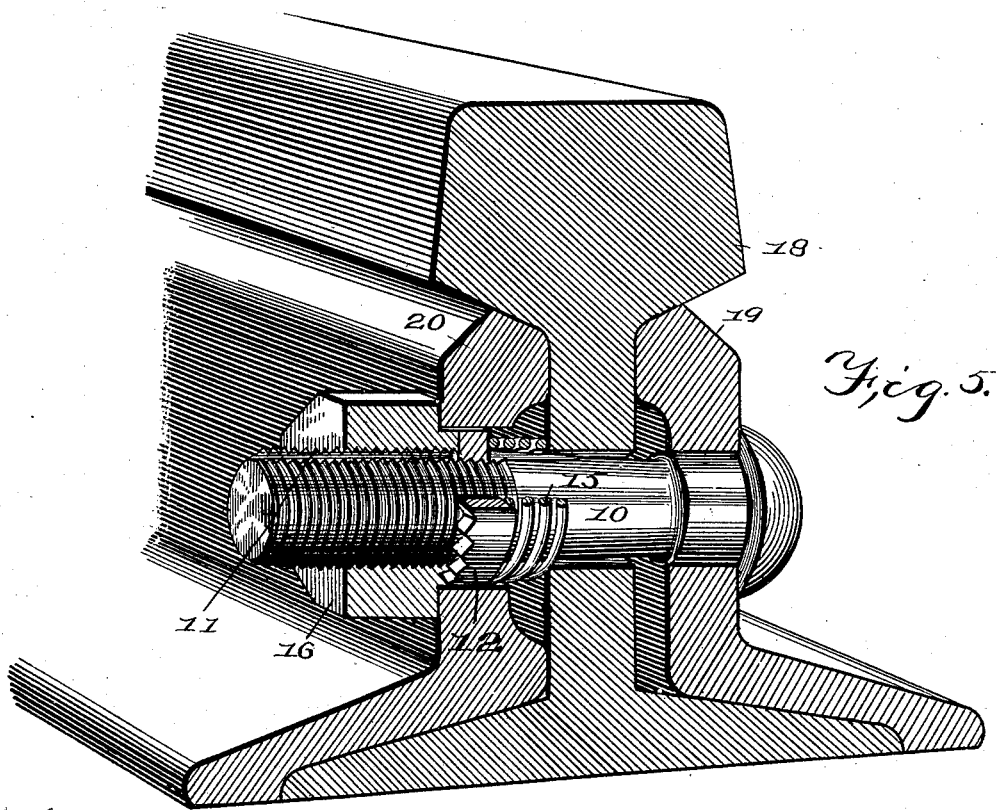

UNITED STATES PATENT OFFICE.

EDWIN R. OLIVER, OF DES MOINES, IOWA, ASSIGNOR OF ONE-HALF TO F. L. MORGAN, OF SAME PLACE.

NUT-LOCK.

SPECIFICATION forming part of Letters Patent No. 666,065, dated January 15, 1901.

Application filed March 17, 1900. Serial No. 9,130. (No model.)

*To all whom it may concern:*

Be it known that I, EDWIN R. OLIVER, a citizen of the United States, residing at Des Moines, in the county of Polk and State of Iowa, have invented certain new and useful Improvements in Nut-Locks, of which the following is a specification.

The object of my invention is to provide an improved nut-lock of few parts, each of which is simple and inexpensive in construction, and in which the bolt-head engages one side of the articles being clamped together and the nut proper engages the other side thereof, as with the ordinary nut and bolt; and my object is further to provide a device of this kind in which the nut is secured against turning on the bolt by shaking or jarring of the parts being clamped, and yet the nut may be turned on the bolt in either direction with a wrench.

My invention consists in the construction, arrangement, and combination of the various parts of the device whereby the objects contemplated are attained, as hereinafter more fully set forth, pointed out in my claims, and illustrated in the accompanying drawings, in which—

Figure 1 shows in perspective a nut having a part of the locking mechanism thereon. Fig. 2 shows a side elevation of a bolt having a longitudinal groove therein to adapt it for use in connection with my improved nut-lock. Fig. 3 shows in perspective a collar to be slidingly but non-rotatably mounted upon the bolt. Fig. 4 shows in perspective a coil-spring to be used in connection with my improved nut-lock. Fig. 5 shows a sectional perspective view of a railway-rail with fish-plates applied to the sides thereof and the parts connected by means of a nut and bolt provided with my improved nut-locking device, parts of which are broken away.

Referring to the accompanying drawings, I have used the reference-numeral 10 to indicate an ordinary screw-threaded bolt, and in the screw-threaded portion of the said bolt is a longitudinal groove 11.

The reference-numeral 12 is used to indicate a nut-locking collar designed to receive said bolt, and it is provided on its interior surface with a projection 13, designed to enter the groove 11, thus providing a collar which is capable of movement longitudinally upon the bolt, but secured against a rotary movement on the bolt. One face or edge of this collar is provided with the teeth 14. These teeth are preferably arranged so that both sides of each tooth are at or near the same angle.

15 indicates a coil-spring designed to be placed on the bolt to impinge upon the opposite side or edge of the nut-locking collar 12.

The numeral 16 indicates an internally-screw-threaded nut of ordinary construction having formed on its inner face an annular collar having a concentrically-arranged series of teeth 17 of a size and shape to coact with the teeth 14 and also having each side of each tooth arranged at about the same angle.

It is obvious that this device may be used in connecting any articles that may be desired. To illustrate one manner in which it may be successfully employed I have shown in Fig. 5 a railway-rail 18, having the fish-plates 19 and 20 applied to the opposite sides thereof. In the fish-plate 19 is an opening to receive the body of the bolt, which is also passed through the web of the rail. In the fish-plate 20 is a round opening somewhat larger than the bolt. In use the bolt is first passed through the fish-plates and the rail. Then the coil-spring 15 is placed upon the bolt, with its one end resting against the web of the rail. Then the nut-locking collar 12 is placed upon the bolt, with its projection 13 in the groove 11, so that said collar may move longitudinally, but not rotate upon the bolt. Then the nut 16 is screwed upon the bolt, its edges being wide enough to overlap the sides of the fish-plate 20, and obviously the parts may be clamped together by means of the nut and bolt in the same manner as though no nut-locking device were used. It will be seen that when thus locked the collar 12 is held by means of the spring 15 against the nut in such a manner that the teeth on the collar and nut will engage each other. Hence no amount of jarring or shaking to which the rail and fish-plates may be subjected will be sufficient to loosen the nut. However, when wear has taken place and the nut becomes loose from any cause other than unscrewing it is obvious that the nut may be readily and quickly tightened in the ordinary manner by simply applying a wrench thereto and turning it until it becomes tight. The resiliency of the spring and the shape of the teeth on the locking-collar and the nut permit this movement. It is obvious, further, in the same connection that the nut may be unscrewed and removed from the bolt in the same manner. Furthermore, the nut itself engages the side of the fish-plate and its annular collar enters the opening therein and serves to center the nut, thereby preventing the threaded portion of the bolt from engaging the opening in the fish-plate and so that a short bolt may be used.

Having thus described my invention, what I claim, and desire to secure by Letters Patent of the United States therefor, is—

1. An improved nut-lock, comprising a bolt, a nut having teeth on its inner surface and a portion on the same surface to engage one side of the articles to be clamped together, a collar on the bolt having teeth to coact with those on the nut and capable of sliding freely on the bolt when the nut is in engagement with one side of the articles to be clamped together, means for preventing a rotation of the collar, and a yielding pressure device for holding the collar toward the nut.

2. An improved nut-lock comprising two or more articles to be clamped together, a bolt passed through them, a sliding collar on the bolt and wholly within one of said articles and having a toothed edge, means for holding said collar against rotation, a yielding pressure device to force said collar outwardly, a nut having teeth on one face to coact with the teeth on the collar and having a flat portion on the same face to engage one side of the articles to be clamped together.

3. An improved nut-lock comprising a bolt, a nut having teeth on its inner surface, both sides of each tooth being inclined on converging lines and a portion on the same surface adapted to engage one side of the articles to be clamped together, a collar on the bolt having teeth on one edge corresponding with those on the nut and designed to coact therewith said collar being capable of sliding freely on the bolt when the nut is in engagement with one side of the articles to be clamped together, means for preventing a rotation of the collar and a yielding pressure device for holding the collar toward the nut.

4. An improved nut-lock, comprising in combination, a bolt having a longitudinal groove, a nut, an annular rim surrounding the opening in the nut and projecting from the inner face of the nut, teeth on said rim having both sides of each tooth inclined on converging lines, a collar having a rib 13 on its inner surface to enter the groove in the bolt said collar being of the same diameter as the said annular rim, teeth on one edge of the collar to conform with the teeth on the rim and designed to coact therewith, and a coiled spring to engage the opposite edge of said collar for the purposes stated.

EDWIN R. OLIVER.

Witnesses:
J. RALPH ORWIG,
THOMAS G. ORWIG.